UNITED STATES PATENT OFFICE.

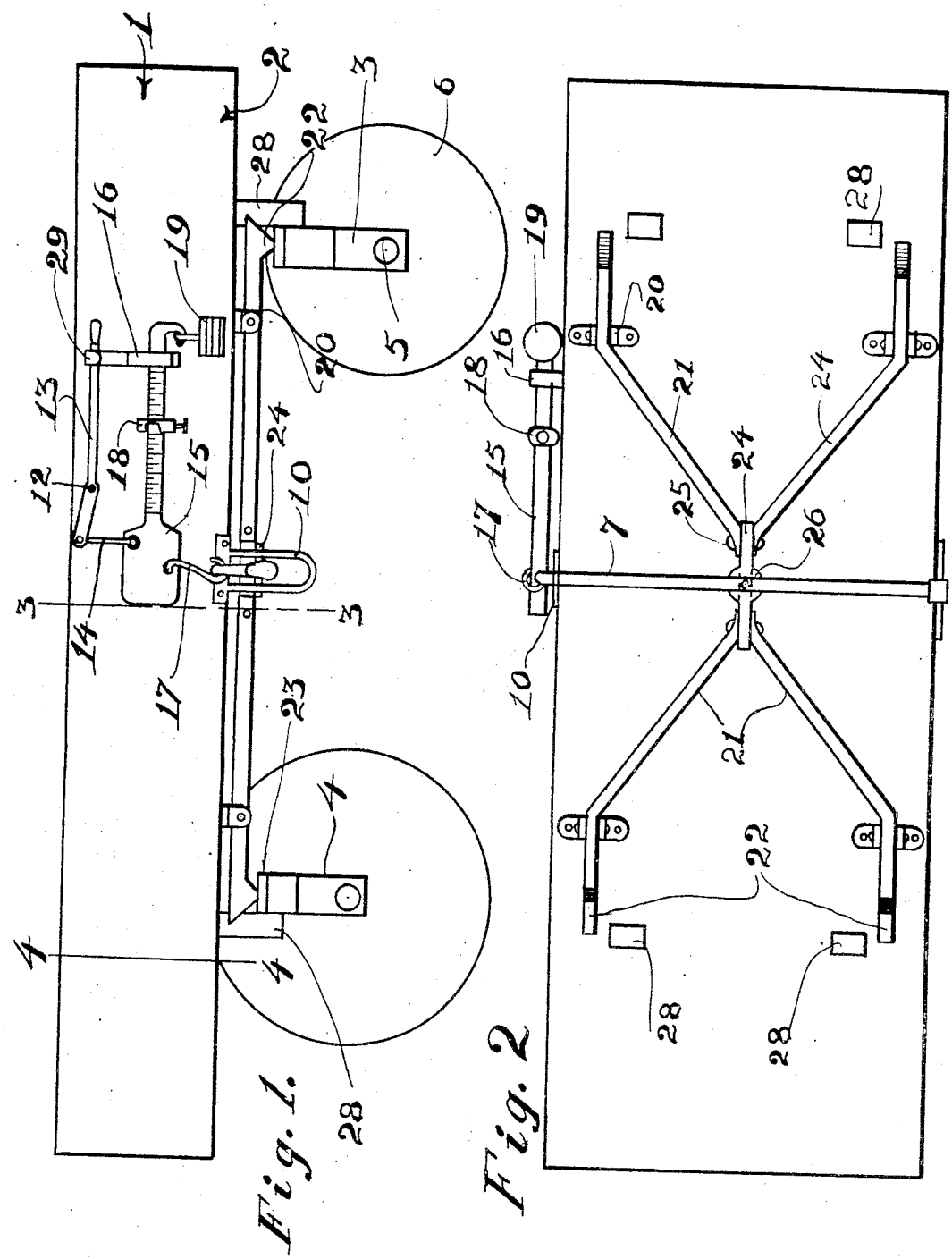

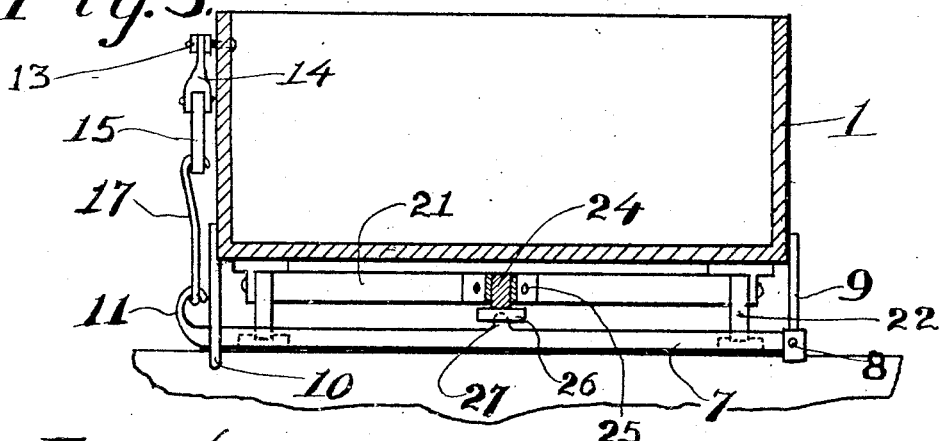
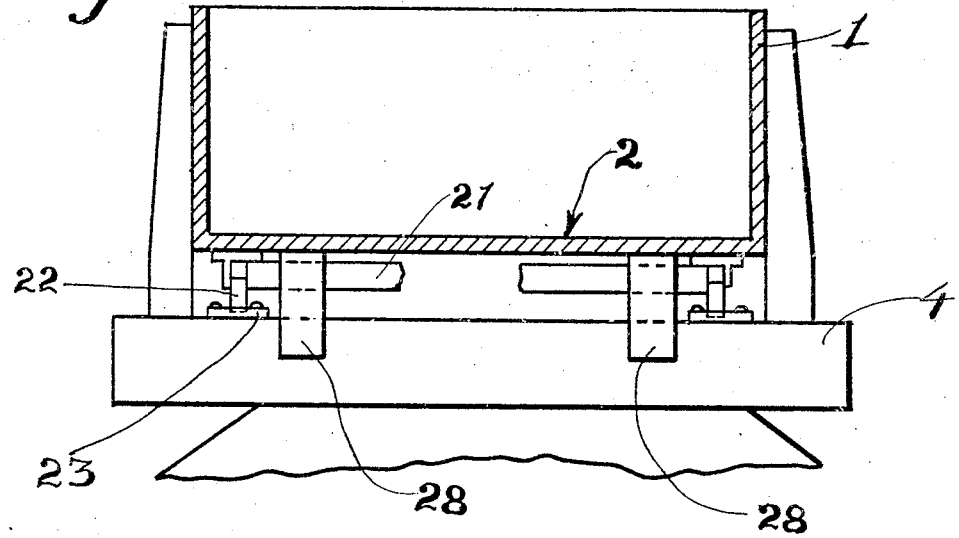
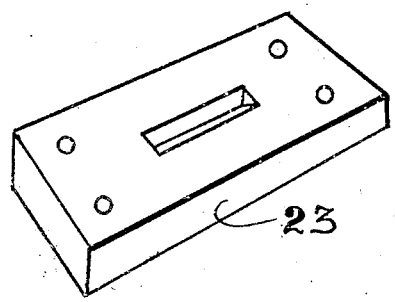

HUGH A. SMITH, OF LOUISVILLE, KENTUCKY, ASSIGNOR OF ONE-FOURTH TO GUSTAV FLEXNER AND ONE-FOURTH TO MORRIS ABRAHAM, BOTH OF LOUISVILLE, KENTUCKY.

WAGON-SCALE.

1,130,771.  Specification of Letters Patent.  Patented Mar. 9, 1915.

Application filed August 26, 1914. Serial No. 858,764.

*To all whom it may concern:*

Be it known that I, HUGH A. SMITH, a citizen of the United States, residing at Louisville, in the county of Jefferson and State of Kentucky, have invented certain new and useful Improvements in Wagon-Scales; and I do hereby declare the following to be a full, clear, and exact description of the invention, such as will enable others skilled in the art to which it appertains to make and use the same.

The primary object of this invention is to provide scale mechanism for an ordinary wagon which can be easily moved into and out of operation whereby the weight of the load on the wagon may be readily ascertained.

Another object of my invention is to provide scale mechanism of the character described that will support the wagon body in a reliable manner and may be readily fitted to the frame of an ordinary wagon and which is of light, simple construction.

The above and additional objects are accomplished by such means as are illustrated in the accompanying drawings, described in the following specification and then more particularly pointed out in the claims.

With reference to the drawings, wherein I have illustrated the preferred embodiment of my invention as it is reduced to practice, and throughout the several views of which similar reference numerals designate corresponding parts, Figure 1 is a side elevation of a wagon body showing my improved scale mechanism attached thereto and in inoperative position, Fig. 2 is a bottom plan view of the wagon body showing a part of my weighing mechanism secured thereto, Fig. 3 is a transverse sectional view taken on the plane of line 3—3 of Fig. 1, Fig. 4 is a transverse sectional view taken on the plane of line 4—4 of Fig. 1, and Fig. 5 is a detail perspective view of the main bearing block.

Referring to the drawings by characters of reference, the numeral 1 designates as an entirety, a wagon of the ordinary construction consisting of a body 2, that is mounted upon front and rear bolsters 3 and 4 respectively. Axles 5 having the usual wheels 6 thereon support the bolsters in the ordinary manner.

My improved scale mechanism comprises a supporting bar 7. The supporting bar 7 is pivoted as at 8 to a depending bracket 9 secured upon one side of the wagon body 1 and is extended transversely of the body at a point approximately centrally of the ends thereof. The free end of the supporting bar 7 is slidably mounted within a slotted bracket 10 similar to the one 9 and is secured on the side of the wagon opposite to the bracket 9. The free end of said bar 7 is bent upwardly and inwardly to form a hook 11.

Pivotally mounted as at 12 upon the wagon body 1 on one side thereof is an operating lever 13 that is pivotally connected by a link 14 at a point adjacent to the pivot point 12 with a scale beam 15 of the ordinary character. This scale beam 15 is slidable adjacent to its free end in a bracket 16 on the side of the body 1. A link 17 pivotally connects the scale beam 15 with the hook 11. An adjustable indicator 18 is slidable upon the beam 15 and the usual weights 19 are suspended from one end of said beam.

Pivoted intermediate their ends in brackets 20 that are secured in pairs to the bottom of the body 1 and adjacent to the ends thereof are small balance bars 21. Each of these bars extends angularly from its pivot point inwardly toward the center of the wagon body but has the other end portion thereof on the opposite side of the pivot point, extended parallel with the longitudinal axis of the body and formed with an enlarged and pointed bearing member 22. A suitable stationary bearing member 23 is fixed to the bolsters at the points where the bearings 22 are arranged to engage. The inner ends of the bars 21 are pivotally secured upon opposite sides of the metallic bearing plate 24 adjacent to the ends of said plate by bolts or other suitable fastening means 25. The bearing plate 24 is enlarged as at 26 centrally of its ends and recessed upon its under face centrally of said enlarged portion to receive an upwardly projecting bearing protuberance 27 formed centrally of the ends of the supporting bar 7. The bolts or fastening elements 25 are preferably extended through the members 21 and 24 and act as pivots for the bars 21. Guide block 28 are carried on the under part of the body 1 and slidably engage the inner faces of the bolsters to prevent relative endwise movement of the body.

A suitable hook 29 is carried upon the side of the body upon which is mounted the operating lever 13 and is designed to hold the lever 13 in down position.

In operation, when the load is placed within the body and it is desired to ascertain the weight thereof, the lever 13 is moved into up or approximately vertical position allowing the weight of the load to depend from the scale beam 15. By adjustment of the member 18 and weights 19 the scale may be operated to indicate the amount of weight in the wagon. The strain of the weight is placed primarily upon the bearings 22 and 23 thus the bearing plate 24 and inner ends of the bars 21 are forced downwardly by the weight. The bar 7 is suspended within the bracket 10 by the lever 13 and coöperating parts and is permitted considerable movement downwardly. When the lever 13 is raised the beam 7 is permitted to move downwardly thus the entire weight of the load is placed upon the beam 15.

My improved mechanism can be readily and easily attached to various characters of vehicles and will operate in a reliable and expeditious manner.

In practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as set forth.

What is claimed is:—

1. The combination with the running gear and body of a wagon or like vehicle of a transverse bar pivoted to said wagon body in spaced relation thereto and at one end, a lever pivoted intermediate its ends to one side of said body, a scale beam, links connecting the scale beam on opposite sides thereof with the lever at the pivoted end thereof, and the free end of said transverse bar, balance bars pivoted intermediate their ends upon the under part of the wagon body and having certain ends thereof extended toward the center of the body, a bearing plate pivotally connected with said last named means, a bearing on said transverse bar coöperating with said bearing plate, bearings on the other ends of said bars and fixed bearing members upon the running gear of the wagon coöperating with said last named bearings.

2. The combination with the running gear and wagon body of a vehicle, of a plurality of balance bars pivoted intermediate their ends upon said body and having certain ends thereof extended toward the center of the body, a bearing plate pivotally connecting said last mentioned ends with each other, a transverse balance bar pivoted at one end to one side of the body and extending thereacross, an operating lever pivoted on one side of the body, a scale beam, a link connecting said scale beam with said operating lever, a link connecting said transverse balance bar with said scale beam, a bracket slidably supporting the free end of said transverse bar, a bearing on said last named bar to coöperate with the bearing plate and the other ends of said bars resting upon the running gear.

3. The combination with a body and running gear of a vehicle of balance bars pivoted intermediate their ends upon said body and having certain ends resting upon said running gear, a bearing plate pivotally connecting the other ends of the balance bars with each other, a transverse balance bar pivoted at one end to one side of the body, a bearing on said bar to coöperate with the bearing plate, scale mechanism and means whereby the weight of the load of the body may be placed upon the scale beam operatively connected with said last named bar, body and scale beam.

In testimony whereof I affix my signature in presence of two witnesses.

HUGH A. SMITH.

Witnesses:
SOL FLEXNER,
L. FRANK WITHERS.